Nov. 2, 1954    O. W. FROST    2,693,135
HOT PLATE PRESS LOADER
Filed March 15, 1949    4 Sheets-Sheet 1
FIG. 1.
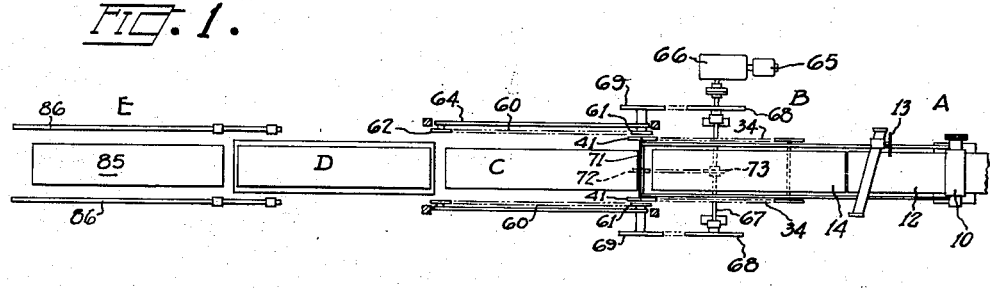
FIG. 6.
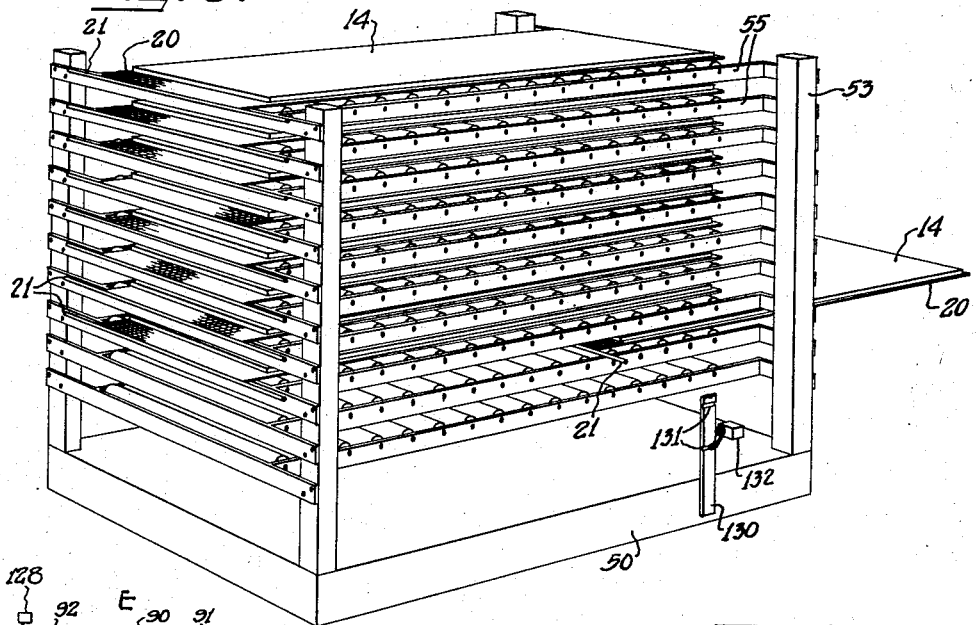
FIG. 2.
FIG. 1a.
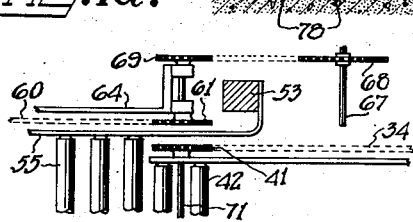
INVENTOR
ORCUTT W. FROST
BY Cook and Schermerhorn
ATTORNEYS Nov. 2, 1954  O. W. FROST  2,693,135
HOT PLATE PRESS LOADER
Filed March 15, 1949  4 Sheets-Sheet 2
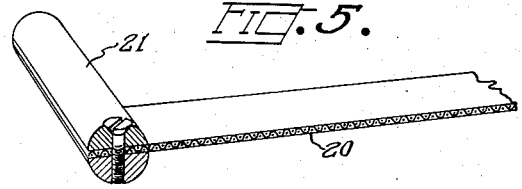
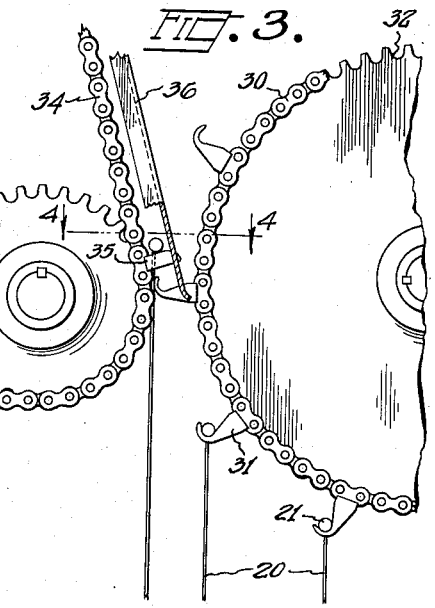
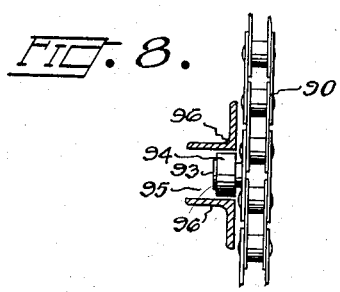
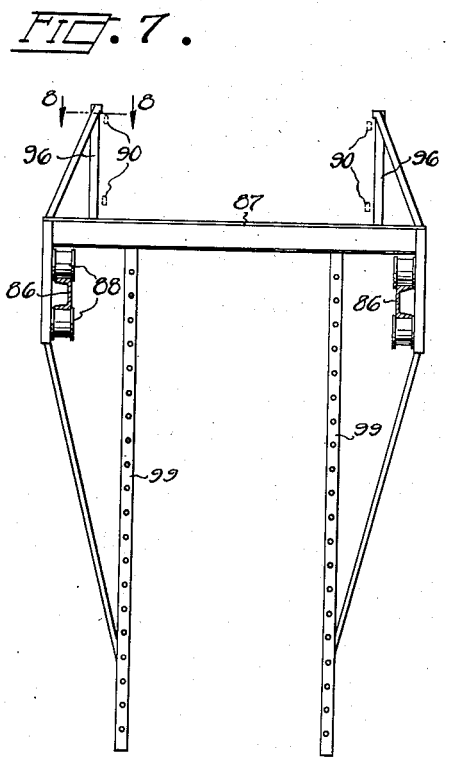
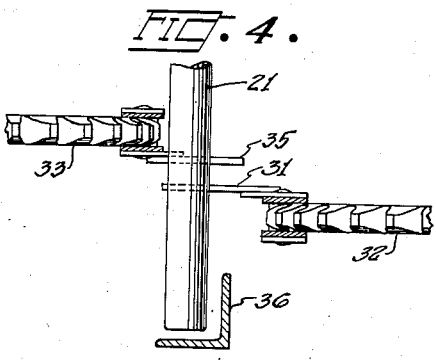
INVENTOR
ORCUTT W. FROST
BY Cook and Schermerhorn
ATTORNEYS

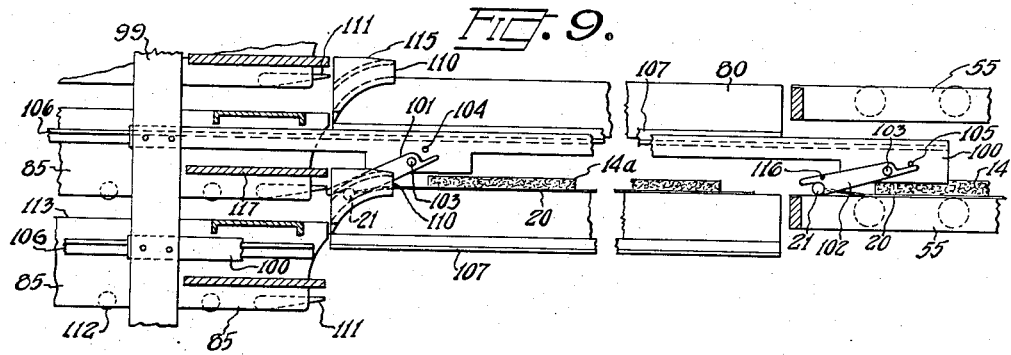
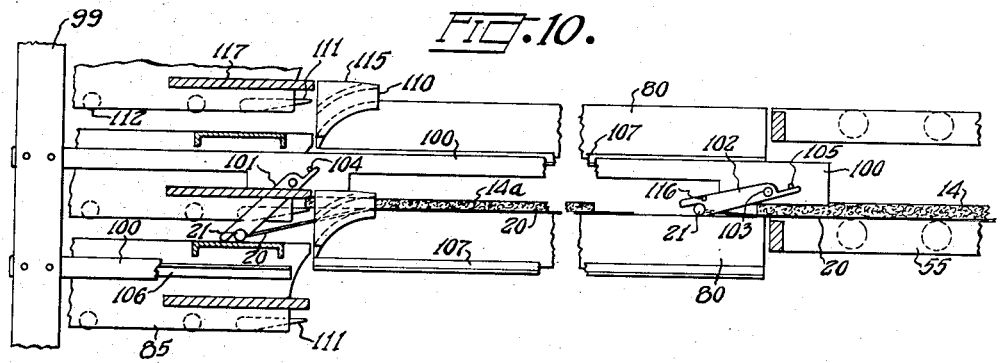
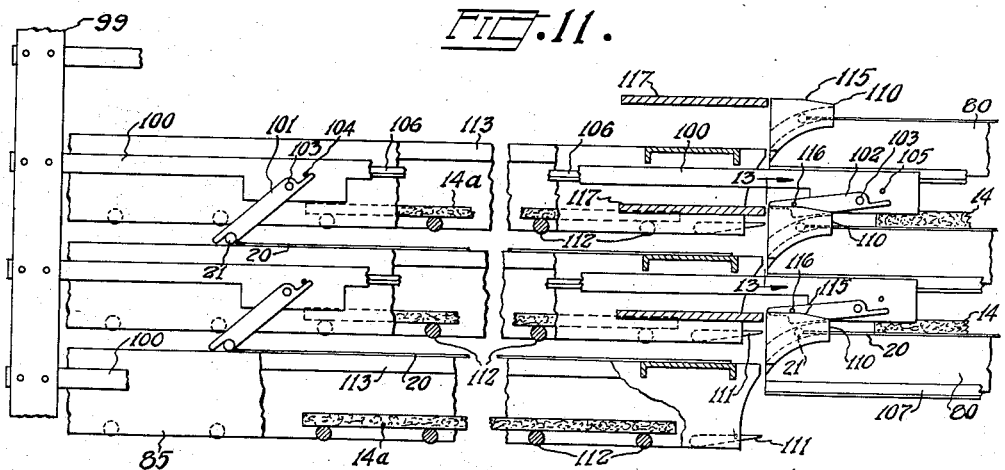
INVENTOR
ORCUTT W. FROST

Nov. 2, 1954
O. W. FROST
2,693,135
HOT PLATE PRESS LOADER
Filed March 15, 1949
4 Sheets-Sheet 4
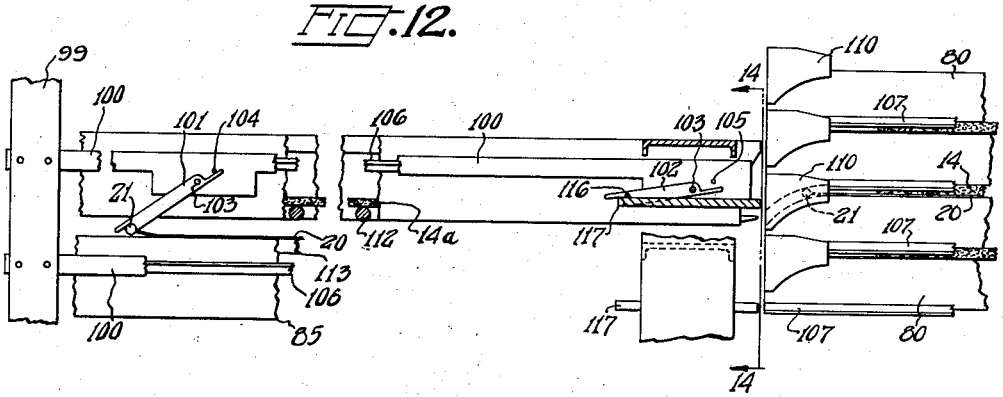
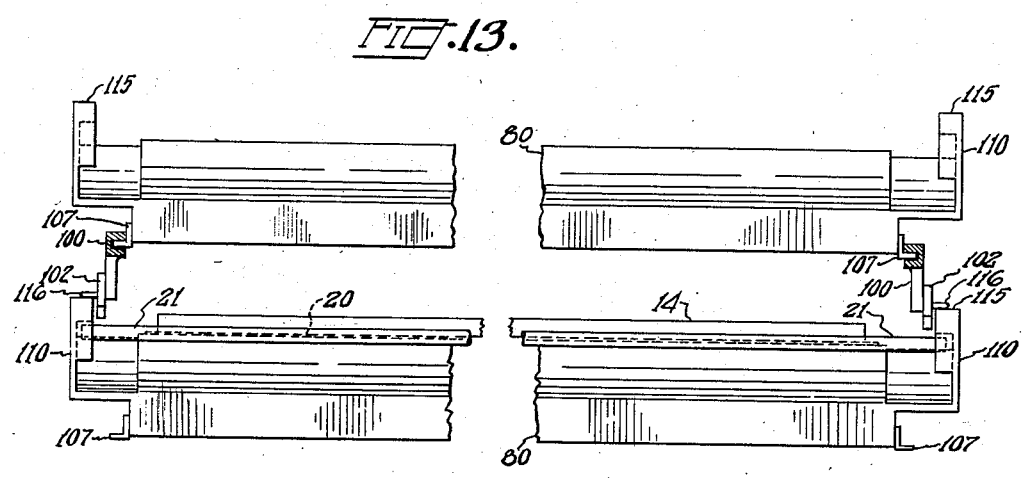
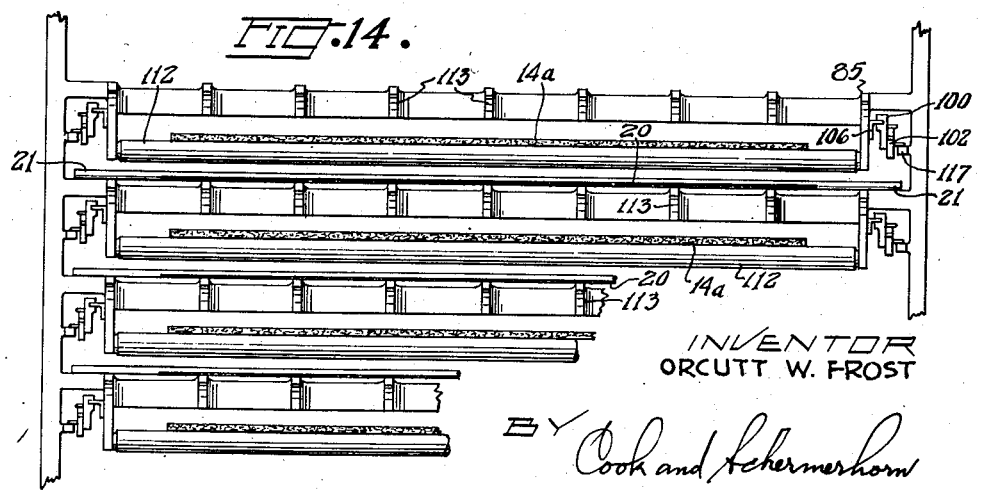
INVENTOR
ORCUTT W. FROST
BY Cook and Schermerhorn
ATTORNEYS

United States Patent Office 2,693,135
Patented Nov. 2, 1954

2,693,135

HOT PLATE PRESS LOADER

Orcutt W. Frost, Gaston, Oreg., assignor to Stimson Lumber Company, Forest Grove, Oreg., a corporation of Oregon Application March 15, 1949, Serial No. 81,569

33 Claims. (Cl. 92—39)

This invention relates to apparatus for loading and unloading a hot plate press in the manufacture of hardboard and the like.

In the so-called "wet process" manufacture of hardboard, wet mats of vegetable fiber are first formed by some suitable process. The present apparatus is designed for use with a type of mat forming machine which produces the mat in a long continuous ribbon. The ribbon is cut into convenient lengths which are deposited individually upon the platens of a hot plate press. In the press, the wet mats are compressed and dried to produce the well known hard panels known in the art as hardboards. This invention deals with the problem of loading the wet mats into the press and unloading the completed hardboards therefrom. The invention is not concerned with the initial forming of the wet mats, which may be accomplished in the usual Fourdrinier or cylinder machine, nor with the specific form of the hot press, which also may be of a conventional type.

The general object of the invention is, accordingly, to provide an improved apparatus which is of simplified construction and is reliable in operation for loading and unloading a hardboard hot press. Ancillary objects directed to the attainment of the general object are to provide an improved mechanism for simultaneously loading and unloading all the press platens, to provide a mechanism which has no loading equipment in the press to be subjected to water and corrosion, to provide means for positively locating the boards in the press in accurately aligned tiered relationship for uniform pressing, and to provide a type of mechanism which eliminates drive equipment on moving feeders, which eliminates the transmission of driving means from floor mounted equipment to moving equipment, which has space to accommodate drives of ample size for long life without the usual limitations to fit close clearances, and which eliminates complicated clutches, transmissions, timers and the like.

Further objects are to provide a loading mechanism employing a novel type of screens which are not required to be wrapped around small diameter rolls, and to provide screen handling mechanism which makes all the screens available for inspection between successive uses of the screen without interruption of production and which allows for the easy replacement of any damaged screens.

Still further objects and advantages will become apparent and the invention will be better understood with reference to the following description of a preferred embodiment of the invention illustrated in the accompanying drawings. It is to be understood, however, that various changes may be made in the construction and arrangement of parts, and that some parts of the equipment may be used without other parts without departing from the spirit of the invention.

In the drawings:

Figure 1 is a plan view of the entire loading and unloading equipment;

Figure 1a is an enlarged fragmentary plan view of one corner of the elevator C in Figure 1;

Figure 2 is a side elevation view of the equipment shown in Figure 1;

Figure 3 is an enlarged fragmentary view of the transfer point between the screen feed conveyor and the next conveyor;

Figure 4 is a sectional view taken on the line 4—4 of Figure 3;

Figure 5 is a fragmentary perspective view of a screen for carrying a mat into and out of the press;

Figure 6 is a perspective view of the elevator loading rack;

Figure 7 is an end elevation view of the press loader and unloader carriage;

Figure 8 is an enlarged sectional view taken on the line 8—8 of Figure 7;

Figure 9 is a sectional view showing the position of the puller bars of the loader and unloader carriage at the start of a loading and unloading operation;

Figure 10 is a view similar to Figure 9, showing the parts in a later position as the press is being loaded;

Figure 11 is a view similar to Figures 9 and 10, showing the positions of the various parts at substantially the completion of the loading and unloading operation;

Figure 12 is a view similar to Figure 11, showing the position of the parts after the completion of the loading and unloading operation and after the press has closed on a new load;

Figure 13 is a cross sectional view taken on the line 13—13 of Figure 11; and

Figure 14 is a cross sectional view taken on the line 14—14 of Figure 12.

General organization

The relationship of the different parts of the equipment is shown in Figures 1 and 2. A wet mat of fiber board stock is made in a continuous ribbon in a Fourdrinier or other type of machine suitable for this purpose. This machine is designated A for purpose of reference, but only the final roller press 10 of the machine is shown on the drawing, as its specific construction is immaterial to the present invention. The drive rollers 11 convey a ribbon of wet stock 12 from the machine at the machine speed, and this ribbon is cut into suitable lengths by the usual flying cut-off 13 to make mats 14 of the proper length for the press.

The mats 14 proceed onto a mat and screen assembler B where they are deposited one by one by progressive movement on top of individual platen screens which are pulled along by novel conveyor means at the speed of the Fourdrinier machine. A further function of the assembler B is to load the elevator C with a complete press load of mats, each on an individual screen, while the press is curing a previous press load of mats. The elevator C is equipped with a loading rack having decks of rollers at the same vertical spacing as the platens of the press D when the press is open, so that when the elevator is in press loading position each mat is aligned with one of the press openings and closely adjacent thereto for convenience in transferring the mats and screens to the press. After the elevator C has released its load of wet mats into the press, it drops to its lowermost position and is refilled deck by deck from the top down by the assembler B while the load in the press is curing. By the time all the decks are filled, the elevator has risen to its press loading position, the press is again open, and the re-loading of the press can commence.

All the openings in press D are loaded and unloaded simultaneously by the loader and unloader carriage E. This carriage travels on overhead tracks on opposite sides of an unloading rack and has a pair of horizontal puller bars at the level of each press opening to reciprocate on opposite sides of the press and engage the screens under each completed hardboard in the press and each wet mat on the elevator. Then, when the carriage moves away from the press, the screens carrying the completed hardboards are drawn out of the press and the screens on the elevator carrying the wet mats are drawn into the press in the same motion. One return movement of the unloader carriage thereby simultaneously loads and unloads all the press spaces. Strippers are provided in the unloading rack for removing the pressed boards from their screens, so that the screens may be returned back to the mat and screen assembler for re-use.

The various operations are coordinated so that a single hot press can handle the output of one Fourdrinier type machine. The novel cooperation of the mat and screen assembler, elevator and unloader carriage enable the output of the Fourdrinier machine, which is a continuous machine, to be handled by a conventional hot press which is a batch type machine, without interruption or congestion in either machine. Hence, both machines may be operated substantially at capacity to obtain the greatest output of which the individual components are capable.

Mat and screen assembler

The type of screen used for handling the mats is illustrated in Figure 5. There is an individual free screen 20 for each mat comprising a piece of flexible rectangular wire cloth slightly wider than the mats and about six inches longer than the strips of mat 14 cut from the ribbon 12 by the flying cut-off 13. At one end of this wire cloth two half round rods are clamped on opposite sides of the wire to form a cylindrical rod 21 which projects at opposite side edges of the wire. Other means for attachment of the rods may be employed.

By "free" screen it is meant that the screen is at all times free of permanent attachment to any other part of the apparatus, except its rod 21, whereby the screens may be transferred and passed along freely from one instrumentality to another, or removed from the apparatus and replaced by other screens without interfering with the operation.

A pile of these screens with the rods all at one end of the pile are placed on a truck 25 on the basement floor 26 below the floor level of the other equipment. This truck of screens is wheeled under an overhead screen feed conveyor comprising a pair of horizontal chains 30 having a large number of hooks 31, so that the rods may be lifted off the trucks and hung by their ends on these hooks. The chains 30 are spaced apart to clear the screen and are driven in a direction to feed the screens toward the sprockets 32. A considerable supply of the screens may be hung on these chains in the manner of the two screens shown in Figure 2. Other types of screen feed means may be devised, however, to serve the purpose of the assembler.

Adjacent the sprockets 32 are another pair of sprockets 33 carrying similar chains 34 equipped with lugs 35 as shown in Figures 3 and 4. These chains are spaced to allow the lugs 35 to pass the hooks 31, and are driven at a higher speed than the chains 30 so that the lugs 35 will lift the rods 21 from the hooks 31 and thereby transfer the screens to chains 34 which travel upwardly. Guides 36 are provided to shift the rods to uniform positions on the lugs and prevent dropping of any of the rod ends. The lugs 35 are spaced apart on their chains 34 a distance equal to the length of the mats 14, these chains in the present instance being of such length as to have two pairs of lugs 35. The chains 34 may be longer but should be some multiple of the mat length.

The screen handling equipment thus far described is preferably located in the basement beneath the main floor 38. As shown in Figure 2, the entire conveyor 30 is suspended under the floor 38, while the conveyor 34 is adapted to carry the screens from this level up through the floor 38 to the level of the conveyor rolls 11 which carry the wet mat from the Fourdrinier machine.

It will be apparent that the screen feed conveyor 30 must move in relation to chains 34 so that as each pair of lugs 35 turns around the sprockets 33 a pair of hooks 31 are in position to transfer a screen to the chains 34. To satisfy this condition, the conveyor 30 may be moved intermittently by the lugs 35 or other means on chains 34, or the sprockets 32 may be geared to the sprockets 33. In either case the chains 30 must move a distance equal to the spacing of hooks 31 while chains 34 move a distance equal to the spacing of lugs 35. Each screen is pulled by the chains 34 upward through an opening in the floor 38 and over a large cylinder 43 having sprockets at its ends for the chains. At cylinder 43 the mat 14, traveling at the same speed as the screen, runs onto the screen and travels with it at the speed of the Fourdrinier machine until the screen and mat reach sprockets 41. The cylinder 43 is of sufficient diameter to avoid sharp bending of the screens.

The parts thus far described which become directly associated with the mats 14 comprise the top horizontal reaches of chains 34, the cylinder 43 which is driven by these chains, and a series of idle rollers 42 to support first the mat alone and then both the screen and mat between the chains. When the rod 21 of a screen arrives at the pair of sprockets 41 it is then ready to be transferred to another pair of chains associated with the elevator C which will remove the assembled screen and the mat rapidly from the rolls 42.

Elevator loading rack

The purpose of the elevator C is to accumulate a press load of wet mats from the continuous output of the Fourdrinier machine and hold these mats in readiness to be all loaded quickly and simultaneously into the press without interrupting the output of the Fourdrinier machine. The elevator shown in Figure 2 comprises a platform 50 supported on a plunger or piston 51 in a vertical hydraulic cylinder 52 sunk in a well in the basement floor. The platform 50 supports a rack framework 53 carrying a plurality of decks 55 of idle rolls. The number of decks 55 is equal to the number of openings in the press, and these decks are spaced vertically to level with the press platens when the press is open with the platens resting on their stops and the elevator is in its uppermost position.

The decks of the elevator are loaded one at a time from the assembler B, starting with the top deck and with the elevator in its lowermost position. As each deck is loaded, the elevator rises one increment equal to the vertical spacing between decks to receive one screen and one wet mat on each deck. Figure 6 shows the elevator partly loaded as it would be when it is approximately at the level shown in Figure 2. In Figure 6, a screen with its wet mat is being pulled onto one of the decks, but the chains which move the screen are omitted in this view.

The screens and mats are pulled onto the decks of the elevator by a pair of chains 60 trained over sprockets 61 and 62 and carrying lugs 63 to engage the rods 21 as these rods are dropped by the chains 34 in passing around the sprockets 41. The sprockets 61 and 62 do not rise and fall with the elevator, but are carried by a stationary frame 64 shown in Figure 1 which remains on the same level with the idle rolls 42. Sprockets 41 and 61 are mounted on separate shafts, as shown in Figure 1a, to effect the transfer of each screen from the chains 34 to the chains 60 without interfering with the movement of the elevator. It will be observed that sprockets 41 are supported within but independently of the loading rack 53, 55 while sprockets 61 are mounted on frame 64 outside and independent of the loading rack. Thus the loading rack can rise and fall between these pairs of sprockets to load all the decks at the same level.

The speed of chains 60 is such that a pair of the lugs 63 will always meet and run parallel with the lugs 35 at the moment the latter reach their sprockets 41. The chains 60, however, are driven at considerably higher speed than the chains 34, so that as soon as a screen is engaged by the lugs 63, it is pulled ahead rapidly to its position on a deck of the elevator, leaving a long gap between the trailing end of the mat just loaded and the leading end of the following mat. The large gap between the successive mats thereby allows time for movement of the elevator to bring the next deck to loading level, and also provides clearance for introducing the rod of the next screen ahead of the following mat it is to meet on cylinder 43.

A unitary drive mechanism is shown in Figure 1 to coordinate the different speeds of the several chains. Motor 65 drives through speed reducer 66 to turn the drive shaft 67. Drive shaft 67 is equipped with sprocket wheels 68 to drive sprockets 69, each of which is mounted on a short shaft with one of the sprockets 61 for the chains 60. In between the sprockets 61 the two sprockets 41 are mounted on a shaft 71, this shaft and its sprockets being supported inside the frame 53 of the elevator but independently thereof. Shaft 71 is driven by a sprocket 72 which is meshed with a chain to a third drive sprocket 73 on the shaft 67. The relative gear ratios are preferably such that the chains 60 will be driven at approximately four times the speed of chains 34, it being remembered that the latter are controlled to operate at the speed of travel of the wet mat 12 emerging from the last press rolls 10 of the Fourdrinier machine. It has already been pointed out that the screen carrying chains 30 are driven directly from the shaft of sprockets 33 to deliver a screen for transfer to the chains 34 each time a pair of lugs on the latter arrives at the sprockets 33.

Press loader and unloader carriage

The press D is of conventional construction, having a stationary top platen 75 and a movable bottom platen 76 which may be raised with great force by a plurality of pistons 77 in hydraulic cylinders 78. Between the top and bottom platens 75 and 76 are a number of intermediate movable platens 80 which open to a uniform spacing for loading and unloading the press when the bottom platen 76 is lowered. All the platens are equipped with heating means to dry the wet mats and to cure or set the binder therein when the press is closed for an interval under great pressure.

In the making of hardboard in such a press, it is generally considered necessary to support the wet mats on wire screens rather than directly upon the press platens for several reasons. In the first place, the wet mat is ordinarily limp and fragile and requires some kind of support for handling when the mat is of fairly large size. In the second place, the mat contains a considerable amount of moisture which must be allowed to escape from between the platens in a relatively short interval of time. A wire screen serves both purposes very well, providing sufficient support for handling the mat, and also allowing for the escape of steam without damaging the mat. The form of such screens and the manner of handling them by mechanical devices in existing hardboard presses is rather unsatisfactory, and the improvement of this phase of hardboard manufacture is one of the more important objects of the present invention.

The numeral 85 designates an unloading rack on the opposite side of the press D from the elevator C. This rack comprises decks of rollers having a vertical spacing corresponding with the spacing of the press platens in open position, only one deck of rollers being shown in Figure 2. A pair of horizontal overhead tracks 86 are supported on opposite sides of the unloading rack 85 and extend some distance along opposite sides of the press. These tracks support the loader and unloader carriage 87 for travel between the full and broken line positions shown. An end view of the carriage appears in Figure 7 showing pairs of track wheels 88. The carriage is driven back and forth between these two limit positions by a pair of endless chains 90 on sprockets 91 and 92. Each chain 90 is equipped with a stud 93 carrying a roller 94 which is confined in a slot 95 between two vertical members 96 mounted on the carriage, as shown in Figure 8. The members 96 are of sufficient height to contain the roller 94 in both the top and bottom reaches of the chain, so that unidirectional movement of the chain will produce reversal of movement of the carriage when the roller 94 passes around the end sprockets. This drive has the advantages that it slows the carriage and reverses it with minimum shock and provides increased mechanical advantage for reversing the carriage and for starting it from its rest position shown in full lines in Figure 2.

The carriage 87 carries a pair of rigid vertical arms 99 having pairs of horizontal puller bars 100. These puller bars are best shown in Figures 9 to 12, and are omitted in Figure 2. There are a pair of puller bars 100 at the level of each press opening whereby the puller bars are also on levels slightly above the decks of the unloader rack 85 and the decks of the elevator C when the latter is raised to its top position. Each puller bar 100 is equipped with an unloading dog 101 and a loading dog 102, the former being relatively close to the arm 99 and the latter being at the extremity of the bar. The unloading dogs engage the rods 21 of the screens in the press and the loading dogs engage the rods of screens in the elevator loading rack. These dogs are pivotally mounted on pins 103 and are prevented from dropping too low by the respective stops 104 and 105. The bars 100 are additionally supported for sliding movement on stationary rails 106 on the unloading frame and rails 107 mounted on the sides of the press platens 80, these rails being aligned at the same levels when the press is open.

On the corners of the platens adjacent the unloading rack are downwardly curved guides 110 to engage the ends of the rods 21 and carry them beneath stripper plates 111 when they are pulled from the press. These plates are positioned slightly below the platen level so that as the screen is drawn out of the press and caused to pass beneath the stripper plate, the pressed board 14a will ride above this plate and be stripped from the screen. In order to keep the screens separate from the boards, each deck 85 is equipped with rollers 112 for the boards and bars 113 for the screens.

The guides 110 have top surfaces 115 to engage pins 116 on the loading dogs 102 to lift these dogs out of engagement with rods 21 when the rods have been pulled out to the proper position just clear of the press platens, as shown in Figures 11 and 13. The ends of the rods will then be confined in the guides 110 beneath the surfaces 115 so that they cannot rise with the dogs when the latter are lifted. The surfaces 115 and pins 116 thereby prevent the screens and mats of the new press load from being pulled part way into the unloading rack as the bars 100 move from their Figure 11 position to their Figure 12 position to clear the press. As the dogs 102 enter the unloading rack the pins 116 leave the guides 110 and are supported by guides 117 in the rack. Movement of the carriage to the right engages the loading and unloading dogs with the rods of the screens, and the return movement simultaneously unloads and reloads the press, one set of screens following immediately behind the other.

Control mechanism and operation

Suitable control mechanism is provided to accomplish automatic control and coordination of the operation of the various components of the apparatus with a limited amount of human supervision and manual manipulation.

One of the operations, however, which should be manually performed, at least in part, is the return of the screens from the unloading rack to the trucks 25. A feature and advantage of the present apparatus and system is the opportunity it affords for inspection of the screens after each use and the removal of any screens that may have become damaged. By pulling the screens out of the unloading rack individually, the operator has ample time to perform these functions before it is time for the press to discharge again. After the screens have been loaded on a truck 25, the truck is wheeled around to the position shown in Figure 2 and the screen rods are hung upon the hooks 31 so that the screens will be lifted from the truck one by one as they are picked up by the chains 34.

Different procedures may be adopted for controlling certain phases of the operation, and manual controls may be substituted for, or added to, certain of the automatic controls, using push button switches. The invention resides primarily in the mechanical part of the apparatus and so it is deemed unnecessary for an understanding of the invention to illustrate the various electrical circuits which may be employed alternatively or in conjunction to effect slightly different modes of operation of the apparatus. Persons skilled in the art can readily adapt a control system to the requirements and conditions of a particular plant.

Automatic switches are disclosed in the drawings, however, for operating the components of the loading and unloading mechanism. A cycle of operations may be assumed to start with the elevator C in its lowest position to start the loading of its top deck. Lowering of the elevator is effected by opening a solenoid relief valve (not shown) to the hydraulic cylinder 52, and so, when the elevator reaches its lowermost position for the loading of its top deck, it trips the switch 125 in the elevator pit to close the solenoid relief valve in preparation for the next lift. It is now assumed that the drive motor 65 is operating and that cut mats 14 are being deposited upon the screens 20 as the latter are brought under the advancing mats by the operation of chains 34. As each deck of the elevator is loaded by the chains 60, a lug 35 on one of the chains 34 momentarily actuates switch 126 to raise the elevator one increment to bring the next deck into loading position on a level with the rolls 42. All the details of the operating mechanism for the elevator are not illustrated but the mechanism includes a vertical cam bar 130 on the elevator having depressions 131 to actuate an increment switch 132 at each loading level, as shown in Figure 6. Each upward movement initiated by switch 126 is thereby halted at the next level by switch 132, the cam bar depressions 131 being spaced the same as the decks 55.

When the elevator reaches its top position, it trips switch 127 to start the motor (not shown) for chains 90 and move loading and unloading carriage 87 to the right and back again to its starting position shown in full lines in Figure 2. In the return movement of the carriage 87, all the screens on the decks of the elevator are pulled into the press with their wet mats, and when there are screens and pressed boards in the press from a previous operation, they will all be simultaneously removed in the same motion of the carriage. Figures 9 to 12 illustrate different positions of the puller bars 100 and loading and unloading dogs 101 and 102 as the carriage 87 moves back to the left. When the carriage reaches its rest position shown in full lines in Figure 2, it trips switch 128 to stop the chains 90 and open the previously mentioned solenoid relief valve connected with hydraulic cylinder 52 to drop the elevator to its bottom position. Under automatic operation as just described, the round trip movement of the carriage 87 is completed in the interval after the bottom elevator deck is loaded and before the next screen on rolls 42 is pulled up to the elevator. During this interval the elevator moves up one increment which may be a short increment, trips switch 127, is unloaded, and then drops to its lowermost position in time to receive the next screen and mat on its top deck. The length of this time interval is governed by the speed ratio existing between chains 34 and the high speed chains 60. The downward movement of the elevator is not interrupted by increment switch 132.

If desired, the switch 128 may also be utilized to control the closing of the press. In regard to the opening of the press, however, it is preferred that this be accomplished manually somewhat before the time that the elevator is completely loaded. It is preferred that the loading of the press not be controlled by the opening of the press. Since the output of the Fourdrinier machine is steady and continuous, the elevator must be unloaded immediately as soon as its decks are all filled, and so, in order to allow a short interval for inspection of the press and correction of any difficulties that may arise, the speed of the Fourdrinier machine should be adjusted to require more time to produce a press load of wet mats than the press requires to cure the mats. It may accordingly be desirable both to close and open the press at the will of the operator so that he may use any available free time while the elevator is loading to the best advantage. When the plant is functioning smoothly in steady production, the largest output may be produced with the least loss of time by increasing the speed of the Fourdrinier machine until there is very little delay at the press in waiting for the next elevator load of wet mats.

It is also desirable to provide a push button switch in addition to switches 127 and 128 to start and stop the chains 90 manually. Then the loading and unloading carriage 87 may be run to the right, almost to the elevator, after the press is opened and while the elevator decks are being filled. This will shorten the press loading time after switch 127 is actuated by the elevator and permit the Fourdrinier machine to be run at higher speed.

Suitable provision may be made to divert the output of the Fourdrinier machine in case of trouble in the press or loading equipment, since it is impractical to stop such a machine suddenly while it is producing mat stock. In such case, the mats may be intercepted at the end of the power driven rolls 11 and returned for re-pulping instead of being delivered onto the rolls 42. Such emergency devices are understood in the art and are not illustrated on the present drawings, as they do not affect the apparatus of the invention.

It will be appreciated from the foregoing description that applicant's novel apparatus accomplishes the loading and unloading of the hardboard press in a more efficient and expeditious manner than has heretofore been practiced, and that it constitutes a considerable improvement in the handling of the screens to extend the useful life of the screens and facilitate their inspection and replacement when necessary. The system as a whole is sufficiently flexible to meet contingencies and unusual situations as they arise, but, at the same time, it is capable of substantially entirely automatic operation for maximum output with a minimum of personal attention under steady operating conditions.

Having now described my invention and in what manner the same may be used, what I claim as new and desire to protect by Letters Patent is:

1. In a press loader for a multiple platen fiberboard press, a plurality of free platen screens, a rod attached to each screen, a supply conveyor for the screens comprising parallel chains having hooks to support said rods, a roller conveyor, parallel chains having lugs to lift said rods from said hooks and transfer said screens to said roller conveyor, and means cooperating with said roller conveyor depositing mats one after another on said screens.

2. In a press loader for a multiple platen fiberboard press, a supply of free platen screens, a roller conveyor, means for removing said screens from said supply and drawing said screens around a roller of said conveyor one after another, and means feeding mats to be pressed over said roller conveyor in timed relation with said first means and depositing a mat on each screen.

3. In a press loader for a multiple platen fiberboard press, a supply of free platen screens, a cylinder roll in a roller conveyor, sprocket wheels at the ends of said roll, parallel chains on said sprocket wheels removing said screens from said supply and drawing said screens one after another around said cylinder and onto said conveyor, and means feeding mats to be pressed over said cylinder in timed relation with said chains and depositing a mat on each screen.

4. In a press loader for loading mats and the like in a multiple platen fiberboard press, a plurality of free platen screens, a slow conveyor carrying a supply of said screens each suspended by one end at intervals less than a screen length apart, a conveyor having means for transferring said screens from said slow conveyor and introducing them under the mats to be pressed one after another approximately end to end, a loading rack for the press, and a high speed conveyor having means to transfer the screens and mats to the rack.

5. In a press loader for a multiple platen press, a plurality of free platen screens having rods attached thereto for pulling the screens, a loading rack on one side of the press, an unloading rack on the opposite side of the press, a carriage having arms extending along the other two sides of the press, means on said arms to engage the rods of screens in the loading rack to pull them into the press by movement of the carriage away from the loading rack and toward the unloading rack, and means on said arms to engage the rods of screens in the press to pull them into the unloading rack in the same movement of the carriage.

6. In a press loader for a multiple platen fiberboard press, a plurality of free platen wire screens having rods attached along one end thereof, a loading rack elevator having decks for a press load of assembled screens and mats to be pressed, and chains adjacent opposite sides of the rack having means to engage said rods and pull the screens and mats on the decks.

7. In a press loader for a multiple platen fiberboard press, a plurality of free platen screens each having a rod attached along one edge thereof, a conveyor depositing mats on said screens one at a time, said conveyor having idle rolls supporting the screens under the deposited mats, means engaging said rods and moving said screens and mats on said idle rolls, a loading rack elevator, means engaging said rods and loading said screens and mats on said elevator, and means engaging said rods and loading said screens and mats in the press.

8. In a press loader for a multiple platen press, a carriage running on a track to load and unload the press, an endless chain having parallel reaches extending along the track between a pair of sprocket wheels, and a stud on the chain engaging a slotted member on said carriage to move the carriage back and forth between said sprocket wheels by unidirectional rotation of the sprocket wheels.

9. In a press loader for a multiple platen press of predetermined width, a plurality of platen screens having end rods of a length exceeding the width of the press platen, a carriage running on a track adjacent the press, an endless chain extending along the track, means on said chain engaging said carriage to move the carriage in opposite directions, means on the carriage to engage the rods of screens to be removed from the press, and means on the carriage to engage the ends of rods on screens to be loaded in the press to move both sets of screens concurrently.

10. In a press loader for a multiple platen press of predetermined width, a plurality of platen screens having end rods of a length exceeding the width of said press platens, a loading rack for screens and mats to be pressed, an unloading rack to receive screens and mats from the press, a carriage running on a track adjacent the press, means on the carriage to engage the rods of a set of screens in the press, means on the carriage to engage the ends of rods of a set of screens in the loading rack, and means driving the carriage to pull the one set of screens out of the press and the other set of screens into the press in one movement of the carriage.

11. In a fiberboard press loader, a roller conveyor for advancing mats to be pressed, one after another, a plurality of free platen wire screens beneath said conveyor, and means for lifting said screens one after another and passing them between the rollers at a distance from the terminal end of said conveyor in timed relation with the advancing mats to introduce a screen under each mat, said assembled screens and mats riding on said rollers.

12. Apparatus for placing fiberboard mats on free platen wire screens comprising a roller conveyor for advancing the mats one after another, means under said conveyor for carrying a supply of said screens, and means operating in timed relation with the advancing mats for lifting said screens from said supply carrying means and passing them up between intermediate rollers of said conveyor one after another to introduce a screen under each mat, said assembled screens and mats being supported on said rollers.

13. Apparatus for placing fiberboard mats on free platen wire screens comprising a conveyor for advancing the mats one after another, a roller in said conveyor at a distance from the terminal end thereof, means operating in timed relation with the advancing mats to engage leading ends of said screens beneath said conveyor and draw said screens up and over said roller one after another for introducing a screen under each mat, said means continuing from said roller in the direction of said conveyor to advance the assembled screens and mats one after another on said conveyor.

14. In a fiberboard press loader, driven rollers for advancing mats one after another, a plurality of free platen wire screens, means engaging leading ends of said screens for introducing a screen under each mat, an elevator loading rack for the press, means engaging leading ends of said screens for pulling said screens and mats into said rack, and means engaging leading ends of said screens for pulling said screens and mats into the press.

15. In a fiberboard press loader utilizing free platen wire screens for carrying mats to be pressed, a mat and screen assembling conveyor, an elevator loading rack for the press, means engaging leading ends of the screens for pulling assembled screens and mats forward one after another on said conveyor, means engaging leading ends of the screens to transfer the mats and screens from said first means and pull the mats and screens into said rack one at a time, and means engaging the leading ends of all the screens in the rack to pull the rack load of screens and mats into the press simultaneously.

16. Apparatus for assembling fiberboard mats on free platen wire screens, comprising a mat conveyor for advancing the mats one after another, rollers in said mat conveyor, as assembling conveyor arranged to draw said screens upwardly through said mat conveyor and thence along said mat conveyor to support said screens on said rollers, and means on said assembling conveyor for engaging said screens in approximately end to end relation to introduce a screen under each mat.

17. Apparatus for assembling fiberboard mats on free platen screens, comprising a roller conveyor for advancing the mats one after another, a plurality of free platen wire screens, an assembling conveyor arranged to draw said screens up between and thence across the top of the rollers of said roller conveyor, and means to feed said screens to said assembling conveyor in timed relation with the advancing mats for introducing a screen under each mat.

18. Apparatus for assembling mats on free platen screens, comprising a mat conveyor for advancing mats to be assembled one after another, a plurality of free platen screens, a supply conveyor to carry a plurality of said screens, an assembling conveyor arranged to introduce a screen under each mat on said mat conveyor, and means on said assembling conveyor to transfer said screens one after another from said supply conveyor.

19. Apparatus for assembling mats on platen screens, comprising a plurality of free platen screens, a mat conveyor, an assembling conveyor running at approximately mat conveyor speed to introduce said screens under mats on said mat conveyor one after another, a screen supply conveyor operating in timed relation with said assembling conveyor to present screens to said assembling conveyor at intervals to place the screens in approximately end to end relation on said assembling conveyor, and means on said assembling conveyor to transfer said screens thereto from said supply conveyor.

20. Apparatus for assembling mats on free platen screens, comprising a mat conveyor for advancing the mats one after another, an assembling conveyor arranged to draw said screens upwardly through said mat conveyor and thence therealong to support said screens thereon, means on said assembling conveyor for engaging said screens in approximately end to end relation to introduce a screen under each mat, and a screen supply conveyor driven in timed relation to said assembling conveyor for delivering said screens to said screen engaging means on said assembling conveyor.

21. Apparatus for assembling mats on free platen screens, comprising a roller conveyor for advancing the mats one after another, a plurality of free platen screens, an assembling conveyor comprising a pair of spaced parallel chains arranged to draw said screens up between the rollers of said roller conveyor to dispose said screens on top of said rollers in timed relation with said advancing mats to introduce a screen under each mat, a rod on one end of each screen, and lugs on said chains to engage said rods and lift said screens from beneath said roller conveyor.

22. Apparatus for assembling mats on free platen screens, comprising a plurality of free platen screens, each screen having a rod attached along one end thereof, a screen supply conveyor having spaced parallel chains equipped with lugs to engage and support said rods, an assembling conveyor comprising a pair of spaced parallel chains arranged to introduce said screens under mats to be assembled therewith, and lugs on said assembling conveyor chains to engage and support said rods, the chains of said assembling conveyor passing in proximity to the chains of said supply conveyor and arranged to cause the lugs of the assembling conveyor to transfer said rods from the lugs of said supply conveyor for transferring said screens one after another from said supply conveyor to said assembling conveyor.

23. In a fiberboard press loader, a plurality of free platen wire screens, a rod attached along one end of each screen for moving the screen, a series of conveyor chains having portions extending into proximity with each other, and lugs on said chains to engage said rods and move said screens, said lugs being arranged to engage the rods of screens advancing from a preceding set of chains to transfer the screens from one set of chains to the next.

24. In a fiberboard press loader for a multiple platen press having platens of predetermined width, a plurality of free platen screens each attached along one edge to a rigid rod longer than the width of said platens, an assembling conveyor engaging said rods for assembling mats to be pressed on said screens one after another, a loading rack, means engaging said rods for transferring said assembled mats and screens to said loading rack, means engaging the ends of said rods for transferring said mats and screens from said loading rack to the press, and means engaging said rods for removing said mats and screens from the press.

25. In a press loader, a supply of free platen screens each attached along one edge to a rigid rod having end portions projecting beyond the screen, an assembling conveyor for assembling a mat on each of said screens one after another, means engaging said rods for transferring said screens from said supply to said assembling conveyor, a loading rack, means engaging said rods for pulling said assembled screens and mats from said assembling conveyor into said loading rack, means engaging said rods for pulling said screens and mats from said loading rack into the press, and means engaging said rods for pulling said screens and mats out of the press.

26. In a press loader, a plurality of free platen screens, each screen having a rod attached along one end thereof, said rods being of sufficient length to extend from opposite sides of the press in passing through the press, a loading and unloading carriage having arms adapted to extend along said opposite sides of the press, and means on said arms to engage said extending ends of the rods to pull said screens into and out of the press.

27. In a press loader, a plurality of free platen screens each having a rod attached along one end thereof, an assembling conveyor for assembling mats to be pressed on said screens one after another, a loading rack on one side of the press, means for transferring said assembled screens and mats from said assembling conveyor to said loading rack, and unloading rack on the opposite side of the press, and means engaging said rods for simultaneously moving one set of mats and screens from the press into said unloading rack and another set of mats and screens from said loading rack into the press.

28. In a press loader, a plurality of free platen screens, each screen having a rod attached along one end thereof, said rods extending beyond the width of the screens and being of sufficient length to project out of opposite sides of the press when moved through the press, a loading rack at one end of the press adapted to hold assembled screens and mats to be pressed, an unloading rack at the opposite end of the press adapted to receive screens and mats from the press, a carriage movable along said unloading rack and having arms to extend along said opposite sides of the press, said arms upon movement of the carriage extending to said loading rack, means on said arms to engage the rods of screens in said loading rack, and means on said arms to engage the rods of screens in said press whereby said press will be unloaded and loaded simultaneously by a single movement of said carriage.

29. In a press loader for loading wet mats in a multiple platen fiberboard press, a plurality of free platen screens, an assembling conveyor having means for introducing said screens under mats to be pressed in approximately end to end relation, a relatively slower supply conveyor carrying a supply of said screens spaced at intervals less than a screen length apart, means for transferring said screens once at a time from said supply conveyor to said assembling conveyor, a loading rack for the press, and a loading rack conveyor running at a faster speed than said assembling conveyor and having means to transfer the assembled screens and mats from said assembling conveyor to the loading rack.

30. Apparatus for loading a multiple platen fiberboard press from a mat producing machine comprising a plurality of free mat supporting screens, an assembling conveyor having means for introducing a screen under each mat produced by said machine, supply means holding a supply of said screens in excess of the minimum number required to operate said apparatus continuously, means for transferring said screens one at a time from said supply means to said assembling conveyor, means for loading said assembled mats and screens into said press and for unloading the pressed boards and screens therefrom, said screens after unloading being free and disconnected from said apparatus for inspection and replacement of damaged screens prior to return to said supply means for repeated use.

31. In an apparatus including a mat forming machine, a decked loading rack, and a multiple platen hot press for making fiber board and the like; a plurality of free platen screens for carrying formed mats from said forming machine through said loading rack and hot press, said screens after leaving said press being released from said apparatus for inspection and replacement of damaged screens before their return to said forming machine, each of said screens comprising a rectangular piece of flexible wire mesh having a rod attached transversely to one end thereof, said rods having ends extending beyond the side edges of the screens for handling the screens, the length of the rods exceeding the width of the press, means in said apparatus engageable with the ends of said rods for pulling said screens one after another from said forming machine to said loading rack, and means in said apparatus engageable with the ends of said rods for pulling a plurality of said screens simultaneously from said loading rack into said press.

32. In an apparatus including a mat forming machine, a decked loading rack, and a multiple platen hot press for making fiber board and the like; a plurality of free platen screens each comprising a rectangular piece of flexible wire mesh having a rod attached transversely to one end thereof, said rods having a length exceeding the width of said press, means engageable with said rods for pulling said screens one after another from said forming machine to said loading rack, and means engageable with said rods for pulling a plurality of said screens simultaneously from said loading rack into said press.

33. Apparatus for making fiber board and the like comprising a mat forming machine, a multiple platen press, a decked loading rack on one side of said press, a decked unloading rack on the opposite side of said press, a plurality of free platen screens for carrying mats from said forming machine, each of said screens comprising a rectangular piece of flexible wire mesh having a transverse rod attached to one end thereof, said rods having a length exceeding the width of said press, means engageable with said rods for pulling said screens and mats from said forming machine to said loading rack one at a time, means engageable with said rods for pulling a press load of screens and mats from said loading rack into said press simultaneously, and means engageable with said rods for pulling a press load of screens and pressed boards simultaneously out of said press into said unloading rack.

References Cited in the file of this patent

UNITED STATES PATENTS

| Number | Name | Date |
|---|---|---|
| 1,606,477 | McClelland | Nov. 9, 1926 |
| 1,672,522 | Greer | June 5, 1928 |
| 1,732,228 | Greer | Oct. 22, 1929 |
| 1,766,251 | Greenleaf | June 24, 1930 |
| 1,767,539 | Mason | June 24, 1930 |
| 1,801,822 | Sutherland | Apr. 21, 1931 |
| 1,849,307 | Mason | Mar. 15, 1932 |
| 1,894,778 | Mason | Jan. 17, 1933 |
| 1,903,102 | Farley | Mar. 28, 1933 |
| 2,251,197 | Nestmann | July 29, 1941 |
| 2,403,249 | Tunley | July 2, 1946 |
| 2,438,896 | Bowen et al. | Apr. 6, 1948 |
| 2,488,104 | Tunley | Nov. 15, 1949 |

FOREIGN PATENTS

| Number | Country | Date |
|---|---|---|
| 433,778 | Great Britain | Aug. 15, 1935 |